United States Patent [19]
Auxerre et al.

[11] Patent Number: 6,003,576
[45] Date of Patent: Dec. 21, 1999

[54] TREAD WITH RECUTTABLE GROOVES

[75] Inventors: Pascal Auxerre, Royat; Bertrand Garnier De Labareyre, Chamalieres, both of France

[73] Assignee: Compagnie Générale des Etablissements Michelin - Michelin & Cie, Clermont-Ferrand Cedex, France

[21] Appl. No.: 09/010,341

[22] Filed: Jan. 21, 1998

[30] Foreign Application Priority Data

Jan. 24, 1997 [FR] France .................................. 97 00865

[51] Int. Cl.$^6$ ............................. B60C 11/13; B60C 11/24; B60C 101/00
[52] U.S. Cl. .................................. 152/209.18; 152/154.2; 152/209.5; 152/209.21; 152/209.22; 152/209.25
[58] Field of Search .............................. 152/154.2, 209.5, 152/209.18, 209.21, 209.22, 209.25, 209.23; 157/13

[56] References Cited

U.S. PATENT DOCUMENTS

| 3,384,145 | 5/1968 | Wolfer . |
| 3,739,828 | 6/1973 | Schaevitz . |
| 3,814,160 | 6/1974 | Creasey . |
| 3,938,572 | 2/1976 | Nishi et al. . |
| 4,226,274 | 10/1980 | Awaya et al. . |
| 5,211,780 | 5/1993 | Kabe et al. . |
| 5,247,983 | 9/1993 | Inez . |

FOREIGN PATENT DOCUMENTS

| 336415 | 5/1977 | Austria . |
| 250113 | 12/1987 | European Pat. Off. . |
| 505178 | 9/1992 | European Pat. Off. . |
| 470785 | 7/1994 | European Pat. Off. . |
| 1498340 | 9/1967 | France . |
| 2347021 | 3/1975 | Germany . |
| 55-110608 | 8/1980 | Japan . |
| 57-167806 | 10/1982 | Japan . |
| 61-037504 | 2/1986 | Japan . |

Primary Examiner—Steven D. Maki
Attorney, Agent, or Firm—Baker & Botts, L.L.P.

[57] ABSTRACT

A tread for a heavy-duty vehicle tire having radial carcass reinforcement surmounted radially by crown reinforcement which tread has grooves that can be regrooved and wherein those parts of the tread that are located radially under the grooves include depth indicators, each indicator indicating the minimum depth that can be reached for effective regrooving and the maximum depth that must never be exceeded.

5 Claims, 1 Drawing Sheet

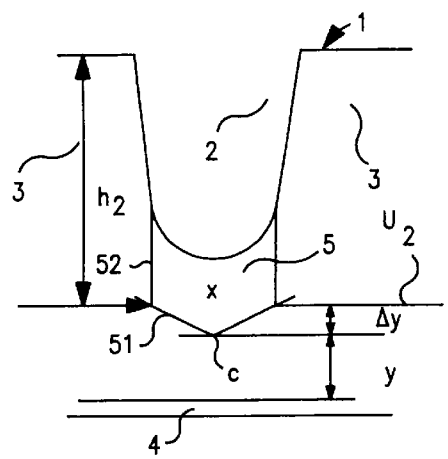
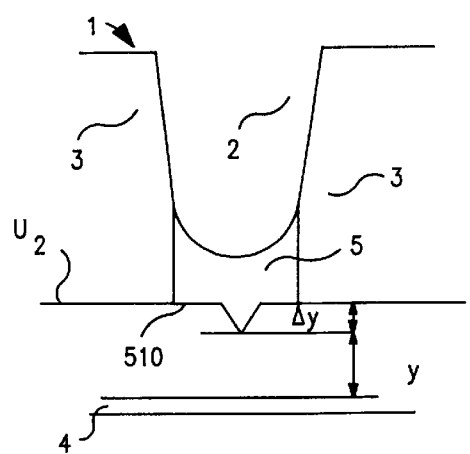
FIG. 1        FIG. 2
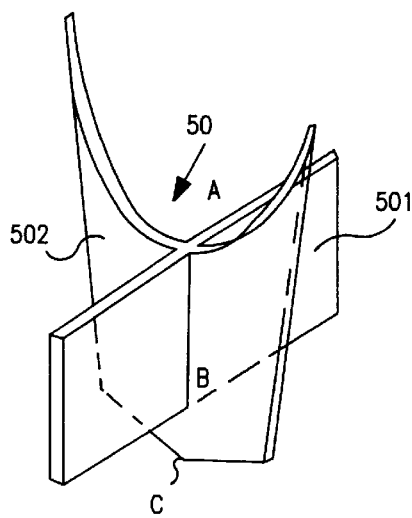
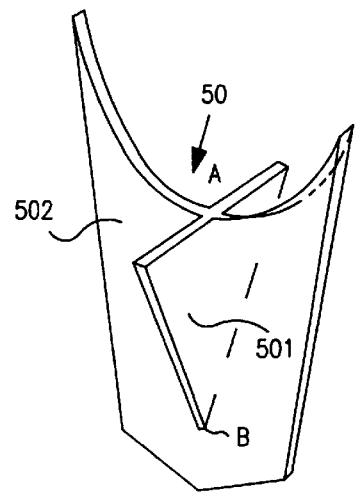
FIG. 3A        FIG. 3B
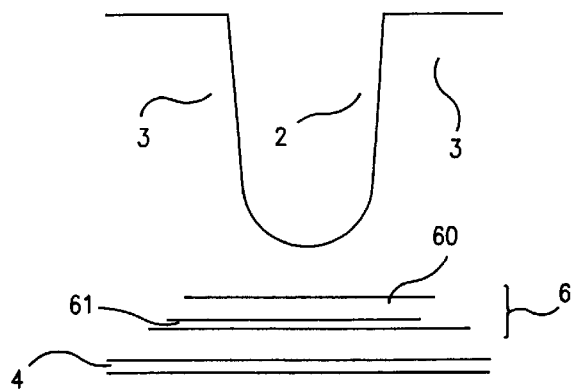
FIG. 4

TREAD WITH RECUTTABLE GROOVES

BACKGROUND OF THE INVENTION

The invention relates to a heavy-duty vehicle tire and more specifically to the tread of such a tire, regardless of the characteristics of the tread.

In the vast majority of cases, the tread patterns on treads for heavy-duty vehicle tires consist of straight, zigzag or wavy circumferential grooves, said grooves sometimes being interconnected by transverse grooves and/or incisions. Said circumferential grooves generally have wear indicators, which are small platforms of rubber covering the bottom of the grooves over a certain circumferential length, said indicator indicating the minimum depth of tread that legally has to remain on the tread in use. Treads for heavy-duty vehicles are regroovable, and tires with such tread patterns have the term "regroovable" or the symbol "U" marked on their sidewalls. Regrooving, on the one hand, allows the adherence potential of the heavy-duty vehicle tire to be extended and, on the other hand, the tire life (expressed in kilometers) to be significantly improved by 15 to 30%, depending on the case, and does so without penalizing the possibility of retreading, which incidentally is an essential feature of a heavy-duty vehicle tire. It should be added that regrooving also gives a fuel saving, as the tire has a lower rolling resistance because of the reduced thickness of the tread.

As is known per se, regrooving a groove is done using a rounded heated blade manipulated by an operator. Said blade, connected to a support which rests on the surface of the tread, can be manipulated manually to make it follow the line of the groove on the surface of the tread, quite accurately, even in the case of a groove that does not follow a straight path. This regrooving operation does, however, demand a number of precautions. The first consists in said operation being carried out when about 2 mm of groove depth remains, said depth being measured between the surface of the tread and the radially outer surface of the wear indicators placed at the bottom of the groove. This precaution allows the tread pattern to be properly seen and thus reproduced without major difficulties. Knowing the remaining depth of the tread and the depth of recut recommended by the tire manufacturer, it is then possible to adjust and set the height of the regrooving blade.

The regrooving depths generally recommended are theoretical depths. Although in most cases these are satisfactory and theoretically allow the blade height to be set so that, generally speaking, a certain thickness of rubber is left between the bottom of the recut groove and the radially upper face of the crown reinforcement, the risks of regrooving too deeply are not precluded. Now, excessive regrooving can cause damage that leads to the premature destruction of the tire casing. It can also compromise the possibility of economic retreading, that is to say retreading in which just the tread is changed. It can also, in some extreme cases, make the plies of the radially-underlying crown reinforcement visible at the bottoms of the regrooved tread, and this is something which is not generally permitted by the legislation in force.

SUMMARY OF THE INVENTION

The invention sets out to allow regrooving which accurately respects the presence of a minimum thickness of rubber, as stipulated by the tire manufacturer, above the radially upper face of the crown reinforcement, while at the same time allowing the life (in terms of kilometers) of the tire to be lengthened to the extent possible.

Thus, the tire in accordance with the invention, comprising radial carcass reinforcement surmounted radially by crown reinforcement formed of at least one ply of reinforcing elements, and a tread with grooves that can be regrooved, is one wherein those parts of the tread which are located radially under the regroovable grooves are fitted with depth indicators, each indicator comprising at least one means that indicates the minimum depth that can be reached for effective recutting and the maximum depth that must never be exceeded.

The depth indicators may have two preferred shapes. In a first alternative form, the indicator is an incision of small but finite width placed at the bottom of the groove either parallel to the direction of said groove or at right angles to said direction, or both simultaneously, the means indicating the minimum and maximum depths then being the geometric shape of the bottom of the depth-indicating incision. According to a second alternative form, the depth indicator is the combination of two layers of rubber arranged in that part of the tread which is located radially under the bottom of the groove, the layers differing from one another and differing from the tread in the characteristics of the rubber compounds of which they are made, characteristics which can be readily recognized by the specialist or professional involved with regrooving the tread. These characteristics may be characteristics of appearance, such as of color, of brightness, or more technical characteristics such as hardness for example.

The correct regrooving of a circumferential groove demands that there are enough depth indicators around the circumference of the bottom of the groove concerned for the operator performing said regrooving to be able to react quickly if necessary. The spacing of the indicators may be between 30 and 100 mm.

The features and advantages of the invention will be better understood from the description which follows which refers to the drawing which, without implied limitation, illustrates some embodiments.

DESCRIPTION OF THE DRAWING

FIG. 1 depicts diagrammatically, viewed in section through the middle, a circumferential groove with a depth-indicating incision, FIG. 2 similarly depicts a circumferential groove with an alternative form of indicating incision, FIGS. 3A and 3B depict diagrammatically, seen in perspective, alternative forms of metal strips intended for making so-called two-branched incisions, FIG. 4 depicts, in section through the middle, a solution using layers of rubber.

DESCRIPTION OF PREFERRED EMBODIMENTS

In FIG. 1, the circumferential groove 2 is delimited axially by two axially adjacent ribs 3 of the tread 1 of a heavy-duty vehicle tire. The groove 2 at its bottom has incisions 5 distributed around the entire circumference of said bottom. A depth-indicating incision 5, which in the example described is flat, has an incision bottom 51 which has a geometric shape such that the distance x between the two almost-vertical walls 52 of the incision 5, or length x of the incision, decreases sharply until it becomes zero for a certain radial distance $\Delta y$ measured between the radially inner end C of the bottom 51 of the incision and the axial line $U_2$ of the points where the geometric shape of the bottom intersects with the walls 52 of the incision. The radial distance Δy is equal to 1 mm, while the distance y separating the point C from the radially outer surface of the crown reinforcement 4 is 1.5 mm. The line $U_2$ is the axial line of minimum depth $h_2$, measured from the surface of the tread, that needs to be reached during the regrooving operation for this recutting to be effective, that is to say for it to allow maximum life in terms of kilometers. Down to the line $U_2$, regrooving allows the line of an incision 5 of length more or less equal to x to be seen at the bottom of the recut. Deeper regrooving, that is to say when the regrooving blade reaches the region of height y, shows an incision line 5 with a length shorter than x, while even deeper regrooving still may reach the point C, whereupon only a point-like line will be seen, the point C indicating the depth limit $h_2+\Delta y$ not to be exceeded.

The alternative form shown in FIG. 2 depicts a geometric shape of the bottom 51 of the incision 5 that allows the incision length to be seen more easily, insofar as the segments 510 of the bottom of the incision, which are parallel to the surface of the tread 1 decrease the length x of the incision to a markedly shorter length for a practically zero radial distance.

The incisions 5 described hereinabove are so-called one-branched incisions. A method that allows the depth reached by the regrooving blade to be seen almost perfectly consists in using so-called two-branched incisions 5, the branches preferably being flat and perpendicular to one another. The metal strip 50 depicted in FIG. 3A is intended to make an incision 5 at the bottom of a groove: it has one flat branch 502 the shape of which corresponds to that of the incision 5 shown in FIG. 1, and one flat branch 501 perpendicular to the branch 502 and the shape of which is simply rectangular. The branch 502 is arranged at right angles to the overall direction of the groove 2 (not shown in FIGS. 3A and 3B for greater clarity), while the branch 501 is parallel to said direction. The height of said branch 501, measured between the point A and the point B, the straight line AB being the line of intersection of the two planes of branches, is less than the height of the branch 502, measured between the point A and the point C, said point C being the point of the bottom of the branch 502 radially furthest in.

Thus, correct regrooving of a groove 2 which has a two-branched incision 5 must have a depth which is such that the line, in the form of a cross, of the two branches disappears and from the point B becomes a single straight line, but a depth at most equal to that which allows the single point-like line corresponding to the point C to appear.

The alternative form of metal strip 50, shown in FIG. 3B, has a branch 501 of triangular shape. The more gradual appearance, on account of the gradual decrease in length of the line of the branch 501, of the single line of the branch 502 at the point B, allows for better identification.

FIG. 4 shows the use, as depth indicator, of a combination 6 of two layers 60 and 61 of rubber. Said two layers can be differentiated from one another in the color of the rubber of which they are made, the layer 60 indicating the minimum depth to be reached, being green, while the layer 61 indicating the maximum permitted depth being red, said colors in any case differing from the black of the rubber of which the rest of the tread 1 is made. The colored layers may be arranged in the tread in the simplest possible way, simply by laying two thin layers 60 and 61 on the profile of compound radially above the crown reinforcement, these two layers entirely covering said profile and being superimposed one on the other, the radially upper layer being, for example, green and 1.5 mm thick, while the radially lower layer is red and 0.8 mm thick. The two layers 60 and 61 can also be in the form of transverse strips of rubber compound, arranged circumferentially at regular intervals.

Each groove 2 of a tread 1 may have incisions 5 and, more specifically, in the case of a heavy-duty vehicle tire, in the circumferential grooves. It goes without saying that one and the same groove 2 may have incisions of differing natures, for example incisions 5 which are flat with just one branch, as shown in FIG. 1, separated from one another by two-branched incisions like those shown in FIGS. 3A and/or 3B. It is equally possible for a circumferential groove 2 to have only one-branched incisions 5, some of these being arranged at right angles to the overall direction of the groove, and others being arranged parallel to said overall direction. As a preference, and in order not to have too great an effect on the rigidity of the tread blocks of a tread pattern, it is advantageous for the two-branched incisions 5 to be placed in the circumferential grooves of normal width or great width (width at least equal to 5 mm), while the so-called narrow grooves (width at most equal to 5 mm) will have one-branched incisions, these branches preferably being parallel to the direction of the groove.

The method of regrooving a tread 1 of a heavy-duty vehicle tire in accordance with the invention consists, once the grooves 2 of the tread 1 have been equipped with the necessary depth-indicating incisions 5 as shown, for example, in FIGS. 3A or 3B, in:

considering only those grooves which at the bottom of the groove have either one-branched or two-branched incisions; these are the only grooves that can be regrooved, carrying out an initial setting of the height of the regrooving blade or gouge, which will be the sum of the theoretical depth to be regrooved according to the tire manufacturer's recommendations, and the tread height remaining to be worn, this height being between 2 and 3 mm, regrooving a groove that contains the indicators according to the invention over a groove length of about 100 mm in order to alter the actual regrooving depth; no trace of the incision in the direction of the groove should appear, in other words the line of the incision, which is cross-shaped, should give way to a single line in the direction of the groove, continuing to regrooved and to check that this is being done correctly; an incision line perpendicular to the orientation of the groove should exist throughout the regrooving operation; the absence of any trace means that the regrooving is outside of tolerance.

We claim:

1. A tread for a heavy-duty tire having a radial carcass reinforcement surmounted radially by a crown reinforcement formed of at least one ply of reinforcing elements, said tread having grooves that can be regrooved, wherein those parts of the tread which are located radially under the grooves are provided with at least one incision indicating a minimum depth to be reached for effective regrooving and a maximum depth that should never be exceeded, the incision being of small but finite width formed in the bottom of a groove, the minimum and maximum depths being indicated by a geometric shape of the bottom of the incision, wherein the incision has just one flat branch and has an incision bottom which has the geometric shape such that the length x of the incision decreases sharply until it becomes zero for a certain radial distance Δy measured between a radially inner end C at the bottom of the incision and an axial line $U_2$ of points where the geometric shape of the bottom intersects with almost-vertical walls of the incision.

2. The tread as claimed in claim 1, wherein the bottom of the incision is formed of lateral segments which are parallel to the surface of the tread and said geometric shape so that the length x of the incision has a markedly short length along said line, $U_2$.

3. A tread for a heavy-duty tire having a radial carcass reinforcement surmounted radially by a crown reinforcement formed of at least one ply of reinforcing elements, said tread having grooves that can be regrooved, wherein those parts of the tread which are located radially under the grooves are provided with at least one incision indicating a minimum depth to be reached for effective regrooving and a maximum depth that should never be exceeded, the incision being of small but finite width formed in the bottom of a groove, the minimum and maximum depths being indicated by a geometric shape of the bottom of the incision, wherein the incision has two flat branches which are perpendicular to one another, one of the branches being arranged perpendicular to the groove, the other branch being arranged parallel to the groove, being shaped and having a height which, measured on a line of intersection of one plane containing one of the branches and another plane containing the other branch is less than the height of said one of the branches measured on the same line of intersection.

4. The tread as claimed in claim 3, wherein the branch arranged parallel to the groove has a flat rectangular shape.

5. The tread as claimed in claim 3, wherein the branch arranged parallel to the groove has a triangular shape.

* * * * *